United States Patent
Chen et al.

(10) Patent No.: US 10,902,061 B2
(45) Date of Patent: Jan. 26, 2021

(54) CONTENT DISCOVERY USING A SKILLS GRAPH

(71) Applicant: COURSERA, INC., Mountain View, CA (US)

(72) Inventors: Kang Chen, Cupertino, CA (US); Chuong Ba Do, Mountain View, CA (US); Hyun Bin Kim, Mountain View, CA (US); Emily Glassberg Sands, Menlo Park, CA (US); Airong Cai, Sunnyvale, CA (US)

(73) Assignee: Coursera, Inc., Mountain View, CA (US)

( * ) Notice: Subject to any disclaimer, the term of this patent is extended or adjusted under 35 U.S.C. 154(b) by 364 days.

(21) Appl. No.: 15/873,566

(22) Filed: Jan. 17, 2018

(65) Prior Publication Data
US 2019/0220547 A1      Jul. 18, 2019

(51) Int. Cl.
| | |
|---|---|
| *G06F 16/901* | (2019.01) |
| *G06Q 50/20* | (2012.01) |
| *G06F 16/903* | (2019.01) |
| *G06T 11/20* | (2006.01) |

(52) U.S. Cl.
CPC ........ *G06F 16/9024* (2019.01); *G06F 16/903* (2019.01); *G06Q 50/2057* (2013.01); *G06T 11/206* (2013.01)

(58) Field of Classification Search
CPC .............. G06F 16/9024; G06F 16/903; G06Q 50/2057; G06Q 11/206

USPC ......................................................... 434/365
See application file for complete search history.

(56) References Cited

U.S. PATENT DOCUMENTS

| | | | |
|---|---|---|---|
| 2018/0253655 A1* | 9/2018 | Wang ........................ | G06N 5/04 |
| 2019/0340945 A1* | 11/2019 | Malhotra ............... | G06N 5/022 |

OTHER PUBLICATIONS

"A/B testing", Wikipedia (https://en.wikipedia.org/wiki/A/B_testing), printed Aug. 18, 2017, 5 pages.
"Apache Cassandra", Wikipedia (https:en.wikipedia.org/wiki/Apache_Cassandra), printed Aug. 28, 2017, 11 pages.
"Crowdsourcing", Wikipedia (https:en.wikipedia.org/wiki/Crowdsourcing), printed Aug. 18, 2017, 26 pages.

(Continued)

*Primary Examiner* — Robert P Bullington
(74) *Attorney, Agent, or Firm* — Brake Hughes Bellermann LLP

(57) ABSTRACT

In one general aspect, a computer-implemented method can include receiving, by a computer system, a name for a course, receiving, by the computer system, a selection of a skill, storing, in a first database included in the computer system, the skill tagged to the course, creating a skills graph including tagged skills for a plurality of courses including the course, the skills graph providing a graph of a skills hierarchy for the course, storing, in a second database included in the computer system, the skills graph, receiving, by the computer system, a query for the skill, and in response to receiving the query, traversing the skills graph, the traversing identifying the skill as a tagged skill for at least the course, and based on identifying the skill as a tagged skill for the course, identifying the name for the course.

14 Claims, 6 Drawing Sheets

(56) References Cited

OTHER PUBLICATIONS

"Directed acyclic graph", Wikipedia (https://en.wikipedia.org/wiki/Directed_acyclic_graph), printed Aug. 28, 2017, 12 pages.

"Graph database" Wikipedia (https://en.wikipedia.org/wiki/Graph_database), printed Aug. 18, 2017, 9 pages.

"Building API layer for C* @Coursera+Nefflix & C* Batch loading for Data Product", Meetup (https://www.meetup.com/de-DE/DataStax-Cassandra-South-Bay-Users/events/232405279/), dated Jul. 14, 2016, printed Aug. 28, 2017, 4 pages.

"Building Smarter Search", Building Coursera (https://building.coursera.org/blog/2017/01/31/building-a-smarter-search-bar-how-we-re-using-crowdsourcing-and-data-science-to-improve-course-disc . . . ), Jan. 31, 2017, 4 pages.

"What is Cassandra?", Apache Software Foundation (http://cassandra.apache.org/) printed Aug. 18, 2017, 2 pages.

D. Chia: "Courral: Storage API layer", dated Jul. 19, 2016, 15 pages.

J. Mannes: "Coursera's new skill search could do for learning what Nettlix did for TV", TechCrunch, posted date Feb. 16, 2017, 8 pages.

Z. Protic et al.: "Version control for graph-based models", Eindhoven University of Technology, dated Sep. 25, 2008, 20 pages.

* cited by examiner

CONTENT DISCOVERY USING A SKILLS GRAPH

TECHNICAL FIELD

This description generally relates to the use of skills graphs with a graph database.

BACKGROUND

A provider of online courses can offer many courses directed towards particular skills that students may want to learn. Each course offering may be directed towards at least one skill, and in many cases multiple skills, that a student may be interested in learning. In some cases, however, when the online course provider offers a large number of courses (e.g., thousands of courses), it may be difficult for a student to identify those courses that are directed towards the one or more skills that they are interested in learning.

SUMMARY

According to one general aspect, a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, a computer-implemented method can include receiving, by a computer system, a name for a course, receiving, by the computer system, a selection of a skill, storing, in a first database included in the computer system, the skill tagged to the course, creating a skills graph including tagged skills for a plurality of courses including the course, the skills graph providing a graph of a skills hierarchy for the course, storing, in a second database included in the computer system, the skills graph, receiving, by the computer system, a query for the skill, and in response to receiving the query, traversing the skills graph, the traversing identifying the skill as a tagged skill for at least the course, and based on identifying the skill as a tagged skill for the course, identifying the name for the course.

Implementations can include one or more of the following features, alone or in combination with one or more other features. For example, traversing the skills graph can further include creating an ordered list of courses included in the plurality of courses that are tagged with the skill. Traversing the skills graph can further include creating an ordered list of at least one of modules, lessons, or videos for a course that teaches the skill. The computer-implemented method can further include, in response to receiving the query, creating a profile for the skill. The computer-implemented method can further include, in response to receiving the query, identifying other skills related to the skill. The computer-implemented method can further include, in response to receiving the query, identifying at least one prerequisite skill for mastering the skill. The skills graph can be a directed acyclic graph. The skills graph can map skills to course content. The skills graph can include a plurality of vertices and edges, each vertex of the skills graph can represent a skill, each edge of the skills graph can be directed from one vertex to another, and each edge of the skills graph can have an associated relevancy score indicating a relevancy of a skill represented the one vertex to the other vertex.

In another general aspect, a system can include a graph database configured to store skills graphs for courses, a skills mapping service configured to map skills to courses, a skill query service configured to receive a skill identifier associated with a skill, and return an ordered list of courses, a graph service configured to generate skills graphs, and store the skills graphs in the graph database, and a recommendation service configured to traverse skills graphs stored in the graph database, identify one or more courses that are tagged with the skill identifier associated with the skill, and provide the ordered list of courses to the skill query service.

Implementations can include one or more of the following features, alone or in combination with one or more other features. For example, the system can further include an A/B testing service configured to A/B test versions of a skills graph for a course, and based on results of the A/B testing, create an optimal skills graph for the course. The system can further include an evaluation service configured to request and gather information and data related to a course, the information and data for use in identifying one or more skills for tagging to the course. The information and data related to the course can be an indication of what skills a learner was taught by the course. Mapping skills to courses can include modeling a hierarchy of skill dependencies for material taught by a course. The graph database can be further configured to store subgraphs. A subgraph can map skills to careers.

In yet another general aspect, a non-transitory, machine-readable medium has instructions stored thereon. The instructions, when executed by a processor, can cause a computer system to receive, by the computer system, a name for a course, receive, by the computer system, a selection of a skill, store, in a first database included in the computer system, the skill tagged to the course, create a skills graph including tagged skills for a plurality of courses including the course, the skills graph providing a graph of a skills hierarchy for the course, store, in a second database included in the computer system, the skills graph, receive, by the computer system, a query for the skill, and in response to receiving the query, traverse the skills graph, the traversing identifying the skill as a tagged skill for at least the course, and based on identifying the skill as a tagged skill for the course, identify the name for the course.

Implementations can include one or more of the following features, alone or in combination with one or more other features. For example, The instructions that cause the computer system to traverse the skills graph can further include instructions that cause the computer system to create an ordered list of courses included in the plurality of courses that are tagged with the skill. The skills graph can include a series of vertices and edges, each vertex of the skills graph can represent a skill, and each edge of the skills graph can be directed from one vertex to another, and each edge of the skills graph can have an associated relevancy score indicating a relevancy of a skill represented the one vertex to the other vertex. The skills graph can map skills to course content. The skills graph can be a directed acyclic graph.

The details of one or more implementations are set forth in the accompanying drawings and the description below. Other features will be apparent from the description and drawings, and from the claims.

BRIEF DESCRIPTION OF THE DRAWINGS

Like reference symbols in the various drawings indicate like elements.

DETAILED DESCRIPTION

A provider of online courses may want to track preferences of a learner, model the indicated interests of a learner, and, based on this information and additional data, the online course provider can then make personalized recommendations to the learner. In some cases, based on the preferences and modeled interests of a learner, the online course provider may make recommendations to other learners with similar preferences and interests.

In order to provide personalized recommendations, an online course provider can create a scheme to classify course content based on skills by essentially creating a skills taxonomy of course content provided by the online course provider. In some cases, some courses may be directed towards learners that satisfy one or more levels of prerequisites. These courses are directed towards learners who have developed or learned certain skills before registering for a particular online course. Knowledge of these skills can lead to a better success rate for positive completion of the online course. Though the online course provider may provide an explicit list of the pre-requisite skills, many of the skills needed for successful completion of an online course may not be explicitly indicated. In these cases, a learner may be ill equipped to successfully complete the course and may not necessarily be aware of this when signing up for the course. This can lead to learner dissatisfaction and dropouts.

An online course provider can map skills for individual courses. The skills can include a set of prerequisite skills as well as other skills, such as beneficial skills, desirable skills, etc. that can be beneficial when taking the online course. In addition or in the alternative, the skills can include taught skills or skills that can be learned at a low level or even at a sub-item level when taking the online course. These taught skills can be in addition to, or supplemental to, one or more main skills the course can teach.

The skills map can connect skills to one another, to content, and to careers. Using the skills map for the online courses along with the learner information such as preferences, interests, and accomplished skills, the online course provider can develop a recommendation platform that can include, but is not limited to, content-based filtering recommendations for providing course recommendations to a learner.

Figure 1:
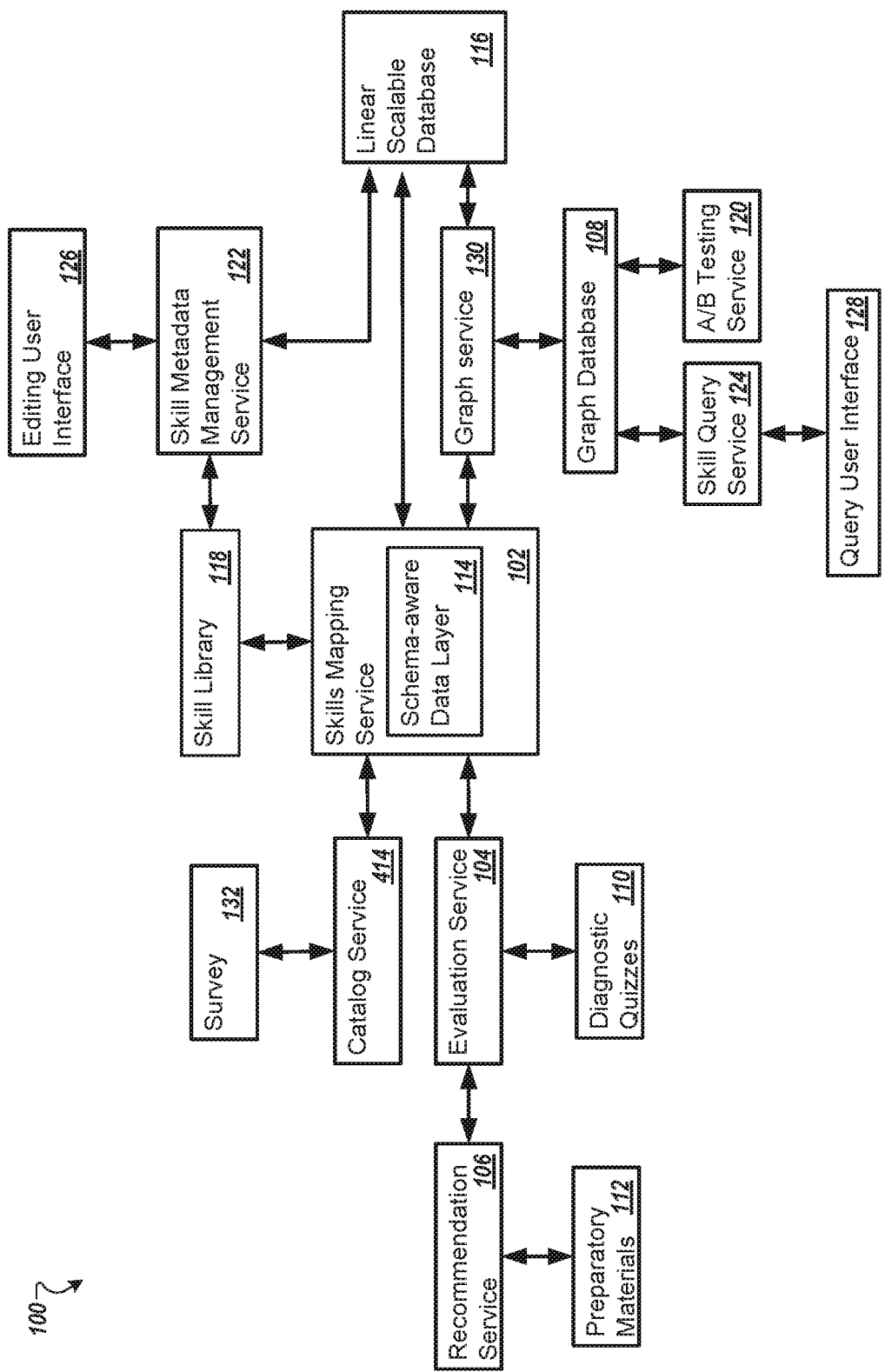
FIG. 1 is a block diagram of a recommendation platform that can be developed by an online course provider.

FIG. 1 is a block diagram of a recommendation platform 100 that an online course provider can develop that can include a skills mapping service 102, an evaluation service 104, a recommendation service 106, an AB testing service 120, a skill query service 124, a skill metadata management service 122, and a graph service 130. As described herein, a service can be included in the computer systems and devices disclosed herein in hardware and/or software for execution by one or more processors included in the computing system and computing devices.

The skills mapping service 102 can interface with the graph service 130. The graph service 130 can access the linear scalable database 116. The graph service 130 can manage a graph database 108 that includes directed acyclic graphs of skills, dependencies, and cached heuristics. A directed acyclic graph can be a directed graph with topological ordering. A directed acyclic graph includes a sequence of vertices and edges, where each edge is directed from one vertex to another. The skills mapping service 102 can include a schema-aware data layer 114 that can help encode a linear scalable database 116 (e.g., Apache Cassandra). The schema-aware data layer 114 can provide service Application Programming Interface (API) boundaries that allow for the presentation of a document model for accessing the scalable database 116.

The skills mapping service 102 can manage skills mapping of the data for a course that is included in the linear scalable database 116 by modeling a hierarchy of skill dependencies for the material taught by the course for including in a skills map of the course. For example, a skills map can be a graph of skills hierarchy that can be generated by the graph service 130 and stored in the graph database 108. The skills mapping service 102 can access a skill library 118. The skill library 118 can include data mined from the content for online courses offered by an online course provider. For example, skills can be identified and mined by using lecture transcripts, correct answers from online course assessments (e.g., quizzes and tests), learner course reviews, and learner course forums. The skill library 118 can include skills that can be identified and mined using data collected from instructors and community mentors for the online course provider.

For example, an instructor can tag a course with the skills the instructors thinks are taught by the online course. In addition or in the alternative, for example, an instructor can tag a course with the skills the instructor thinks are prerequisites for the taking of, and successful completion of, the online course. The skill library 118 can include skills that can be identified and mined using data collected from information provided by asking learners what the learner thinks they were taught by the online course. The evaluation service 104 can request and gather this data and information.

Figure 3A:
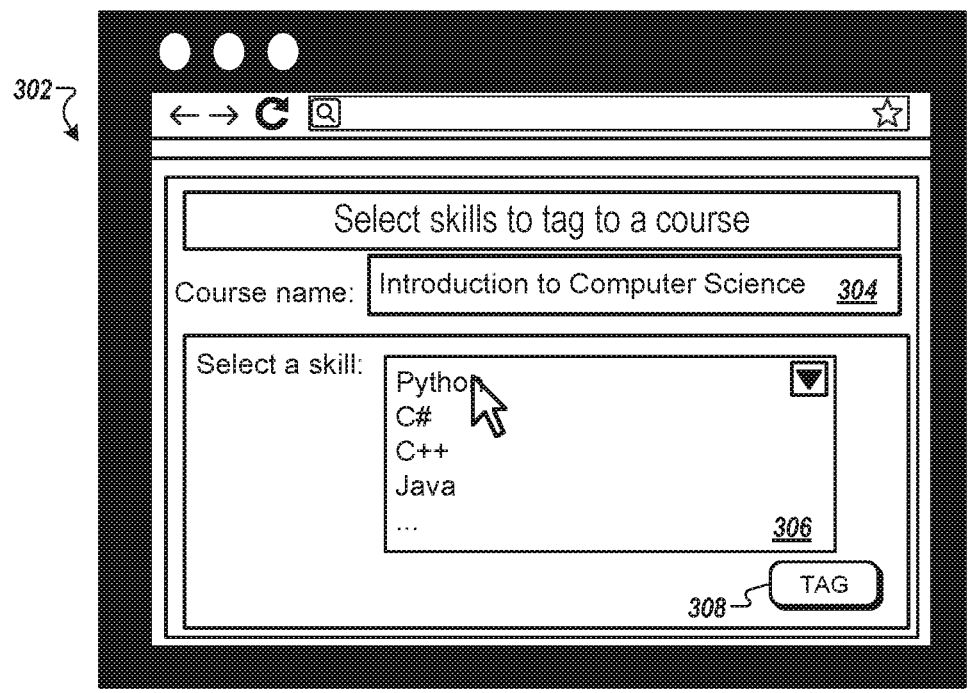
FIG. 3A is a diagram of an example user interface for an editing user interface provided by an editing user interface application.

A skill metadata management service 122 can include backend services that can edit and update the data included in the skill library 118 and/or the linear scalable database 116. An editing user interface (UI) 126 can provide a graphical user interface that can allow users (e.g., instructors, administrators) with the appropriate editing authority to submit editing requests to the skill metadata management service 122. An example editing UI 126 is shown in FIG. 3A.

Figure 3B:
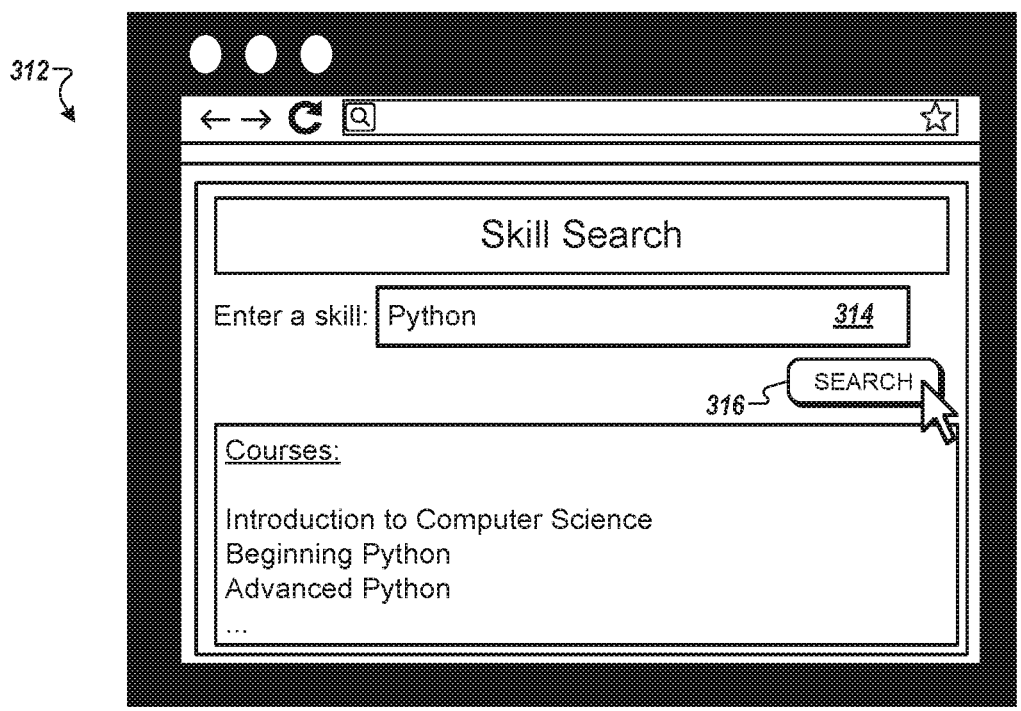
FIG. 3B is a diagram of an example user interface for a query user interface provided by a query user interface application.

A skill query service 124 can include backend application programming interfaces (APIs) that can provide information and data for a given skill and/or for a given course. For example, when provided a skill, the skill query service 124 can return an ordered list of courses teaching the skill, a profile for the skill, similar and/or related skills, prerequisite skill for mastering the skill, and an ordered list of modules, lessons, and/or videos for a course that teach the skill. A skill profile can include, but is not limited to, a skill name, one or more aliases for the skill, parent or child skill of the skill, and a domain for the skill. A domain can be an area of study, such as, for example, computer science, architecture, biology, chemistry, etc. In another example, when provided a course name, the skill query service 124 can return an ordered list of skills taught by the course and an ordered list of recommended prerequisite skills for the course. In some implementations, when provided a domain, the skill query service 124 can return an ordered list of skills associated with the domain. In some implementations, when provided a career (e.g., computer programmer, biologist), the skill query service 124 can return an ordered list of skills identified as needed or beneficial to know for pursuing the career. A query user interface (UI) 128 can provide a GUI for entering information and data for use by the skill query service 124 (e.g., a skill, a course name, a career). The query user interface (UI) 128 can provide a GUI for returning information and data from the skill query service 124 (e.g., an ordered skills list, an ordered course list, an ordered list of modules, lessons, and/or videos for a course). An example query UI 128 is shown in FIG. 3B.

A skill to course classification model can use the tagged skills for a course to determine the value of a binary label for a response variable for a skills query. For example, if the queried skill is taught by the course the value of the binary label will be equal to one. For example, if the queried skill is not taught by the course the value of the binary label will be equal to zero. The binary label can be used to train skill-course relationships and to predict a probability of a skill taught by a course including one or more skills that may not be tagged.

A skills graph, for example, can connects skills to each other, to content (e.g., courses), and to careers. In some implementations, for each course, a score can be associated with each skill included in the skills graph. For example, the graph scores can be crowdsourced to learners and the learners can be asked to provide feedback on the relevance of the identified skills for the course. In some implementations, the predicted probability from the skill to course classification model can be an important input to the score. In some cases, suggestions for answers to questions provided to learners about the relevance of a particular identified skill can include suggestions based on performing a traversal of the skills graph and identifying skills tagged at nearest nodes to the particular identified skill. The results of the crowdsourcing can be used to modify or fine-tune the skills graph.

The graph database 108 can be built on top of the linear scalable database 116. The edges of the directed acyclic graph can be modeled on top of the linear scalable database 116. The building of the graph database 108 on top of the linear scalable database 116 can provide the skill tags for the content stored in the linear scalable database 116. The graph database 108 can include graphs mapping skills to content. Multiple types of information, such as different levels of granularity of the skills that are tagged and then included in the graph database 108, can be layered in association with particular content (e.g., a course). The graph service 130 can provide graph traversals of content included in the linear scalable database 116. The building of the graph database 108 on top of the linear scalable database 116 preserves the linear scalability of the linear scalable database 116 that stores course content while allowing graph traversals of the data stored in the linear scalable database 116.

In some implementations, the graph service 130 can generate and maintain different copies of a directed acyclic graph for particular content. Each graph copy can be stored (e.g., in the graph database 108) and versioned. In some implementations, the A/B testing service 120 can A/B test each version of a graph. For example, the A/B testing service 120 can perform A/B testing of skills graphs that can test two variations of a skills graph for a particular content (e.g., a particular course). The A/B testing performed by the A/B testing service 120 can identify if a change in materials for a particular course (the variant) resulted in an improvement in a skill taught by the course. In another example, the A/B testing performed by the A/B testing service 120 can be used to help create an optimal skills graph by discovering skills using the graph. The use of A/B testing can result in the creation of an optimal skills graph for a course.

The recommendation service 106 can traverse a skill graph when providing course recommendations to learners. For example, content for online courses can be stored in the linear scalable database 116. The stored content can be tagged with a skill. For example, stored content can be a course in computer architecture. The course may be tagged with a "Python" skill. The example "Python skill" can be a pre-requisite skill. In addition or in the alternative, the computer architecture course may be tagged with a "flash memory" skill. The example "flash memory" skill can be a taught skill. The skills mapping service 102 can model a potential deep hierarchy of skill dependencies (both required and taught) for the material included in a course (e.g., course content).

In some implementations, the graph database 108 can include one or more subgraphs that can provide mapping of skills to other types of criteria or content. The subgraphs can provide more granular skill to content mappings. For example, a subgraph can map skills to careers. The skills mapping service 102 may access information stored in a database that relates skills to careers by tagging careers with certain skills. For example, a learner may want to learn a particular skill and is interested in possible career choices that would need or utilize the particular skill. The recommendation service 106 can traverse or query graphs of careers noting that are tagged with the particular skill and provide a list of those careers to the learner. In addition or in the alternative, the recommendation service 106 can traverse or query graphs of courses noting which are tagged with teaching the particular skill and provide a list of those courses to the learner.

The evaluation service 104 can create and/or generate a set of diagnostic quizzes 110 for a course that a learner is taking. The results of taking the diagnostic quizzes 110 by the learner can provide information about how well the learner has mastered the skills taught by the online course. For example, one or more diagnostic quizzes can be offered to the learner at the completion of the course by the learner. In another example, in cases where a course includes multiple modules, a diagnostic quiz can be offered to the learner at the completion of each module by the learner. The evaluation service 104 can use the results of the diagnostic quizzes to compute a mastery of skills provided by the online course by the learner who is taking the online course. For example, the evaluation service 104 can generate a skills evaluation report for the individual learner that is associated with the online course.

In some cases, a skill-course classification model application 244 may identify one or more skills learners identify as being provided by an online course that may not have been tagged as a skill for the online course. For example, a skill that may be associated with a Python programming course may be NumPy, a package for scientific computing with Python. The skill-course classification model application 244 is described in further detail with reference to FIG. 2. The recommendation service 106 can formulate one or more recommendations that can be provided to individual learners interested taking online courses. The recommendation (which can be considered a high-level recommendations) can be whether the learner should take or enroll in a particular course. The recommendation can be an offer of one or more alternative courses. In addition, a learner may be offered supplemental preparatory materials 112. The offered preparatory materials 112 can be based on a variety of data sources. The offered preparatory materials 112 can be based on the skills included in a skills evaluation report for the learner.

The recommendation service 106 can perform a skill-based search of the skills graph of content (e.g., courses) provided by an online course provider when formulating course recommendations to learners. The skill-based search can use a classification model that can predict a probability of a particular skill being taught by the course. The classification model can be used to predict, for each course, an ordered list of skills most likely to be learned by a learner. In addition or in the alternative, the classification model can be used to predict, for each skill, an ordered list of content (e.g., courses) that is most likely to teach the skill. The probability can be based on features mined from the course corpus and on feedback provided by learners that can be gathered by a catalog service 414, which can include, but is not limited to, a learner-facing data collection survey in which, for any given course, a learner can self-report skills learned in that course. The catalog service 414 is described in further detail with reference to FIG. 4.

Figure 2:
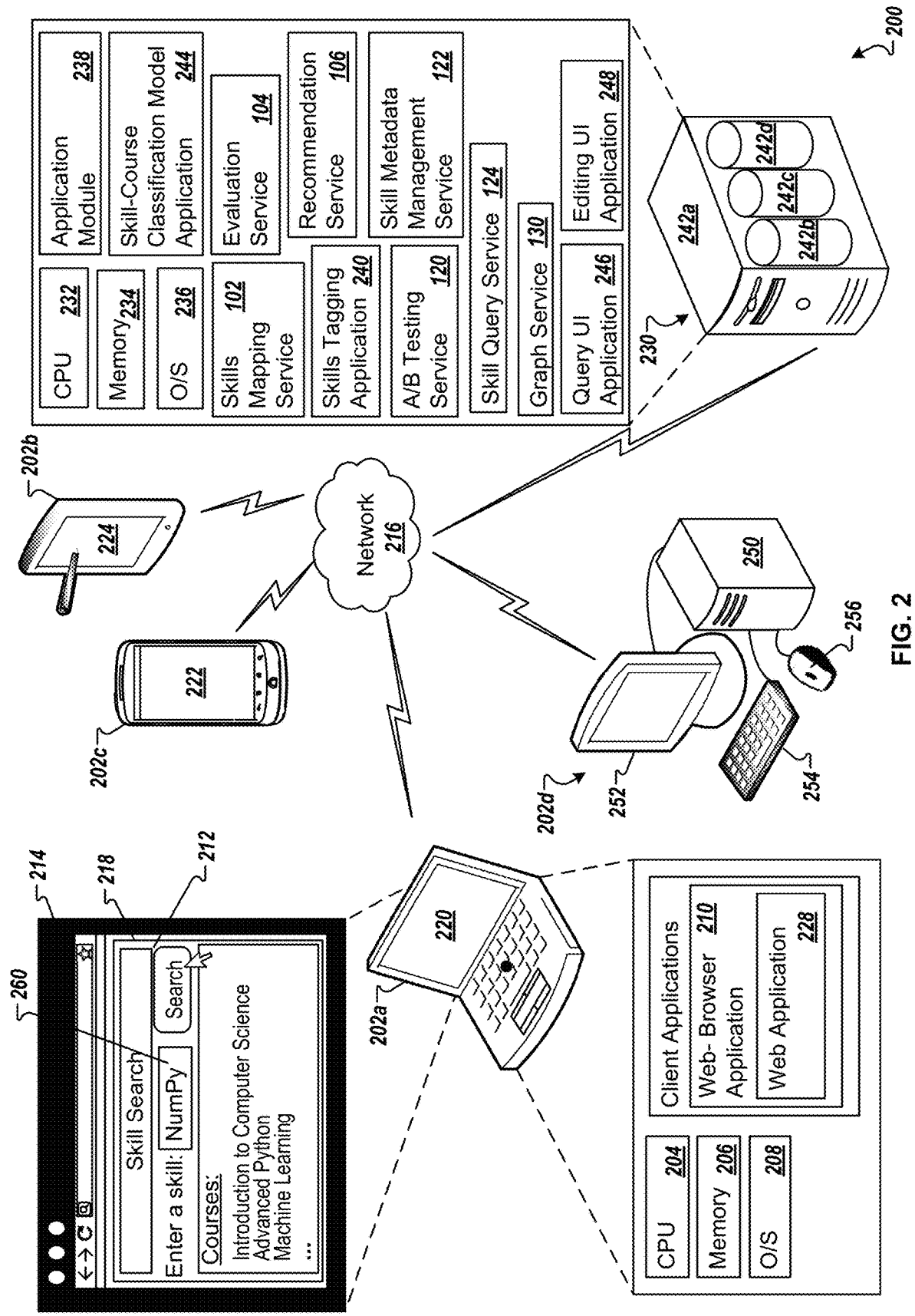
FIG. 2 is a diagram of an example system that can provide content discovery for courses using a skills graph.

FIG. 2 is a diagram of an example system 200 that can provide content discovery for courses using a skills graph. The system 200 can be used to perform skills-based searches.

The system 200 includes a plurality of computing devices 202a-d (e.g., a laptop or notebook computer, a tablet computer, a smartphone, and a desktop computer, respectively). The system 200 includes a computer system 230 that can include one or more computing devices (e.g., a server 242a) and one or more computer-readable storage devices (e.g., a database 242b, a database 242c, and a database 242d).

An example computing device 202a (e.g., a laptop or notebook computer) can include one or more processors (e.g., a client central processing unit (CPU) 204) and one or more memory devices (e.g., a client memory 206). The computing device 202a can execute a client operating system (O/S) 208 and one or more client applications, such as a web browser application 210. The web browser application 210 can execute one or more web applications (e.g., a web application 228).

The server 242a included in the computer system 230 can include one or more processors (e.g., a server CPU 232), and one or more memory devices (e.g., a server memory 234). The computing devices 202a-d can communicate with the computer system 230 (and the computer system 230 can communicate with the computing devices 202a-d) using a network 216. The server 242a can execute a server O/S 236. For example, the server 242a can provide content that can be included in (stored in) a database 242b, where the database 242b can be considered a repository. In some implementations, the database 242b can be a linear scalable database. The server 242a can include an application module 238. The application module 238 can provide the content (e.g., a video of an online course) to the computing devices 202a-d using the network 216.

In some implementations, the computing devices 202a-d can be laptop or desktop computers, smartphones, personal digital assistants, tablet computers, or other appropriate computing devices that can communicate, using the network 216, with other computing devices or computer systems. In some implementations, the computing devices 202a-d can perform client-side operations, as discussed in further detail herein. Implementations and functions of the system 200 described herein with reference to computing device 202a, may also be applied to computing device 202b, computing device 202c, and computing device 202d and other computing devices not shown in FIG. 2 that may also be included in the system 200.

The computing device 202a includes a display device 220. In some implementations, the display device 220 can be a touchscreen. The computing device 202b includes a display area 224 that can be a touchscreen. The computing device 202c includes a display area 222 that can be a touchscreen. The computing device 202d can be a desktop computer system that includes a desktop computer 250, a display device 252 that can be a touchscreen, a keyboard 254, and a pointing device (e.g., a mouse 256). A user can interact with one or more input devices and/or a touchscreen to hover over text or icons included in a user interface displayed on a display device.

In some implementations, the computer system 230 can represent more than one computing device working together to perform server-side operations. For example, though not shown in FIG. 2, the system 200 can include a computer system that includes multiple servers (computing devices) working together to perform server-side operations. In this example, a single proprietor can provide the multiple servers. In some cases, the one or more of the multiple servers can provide other functionalities for the proprietor.

In some implementations, the network 216 can be a public communications network (e.g., the Internet, cellular data network, dialup modems over a telephone network) or a private communications network (e.g., private LAN, leased lines). In some implementations, the computing devices 202a-d can communicate with the network 216 using one or more high-speed wired and/or wireless communications protocols (e.g., 802.11 variations, WiFi, Bluetooth, Transmission Control Protocol/Internet Protocol (TCP/IP), Ethernet, IEEE 802.3, etc.).

In some implementations, the web browser application 210 can execute or interpret a web application 228 (e.g., a browser-based application). The web browser application 210 can include a dedicated user interface (e.g., a web browser UI 214). The web application 228 can include code written in a scripting language, such as AJAX, JavaScript, VBScript, ActionScript, or other scripting languages. The web application 228 can display a web page 218 in the web browser UI 214. The web page 218 can include a graphical user interface (GUI) 212.

The content included in (stored in) the database 242b can be online course content that is tagged with one or more skills as described herein. For example, referring to FIG. 1, the database 242b can be a linear scalable database (e.g., the linear scalable database 116). In some implementations, referring to FIG. 1, a graph database (e.g., the graph database 108) that is built on top of the online course content can be stored (included) in the database 242c. The skill library 118 can be stored in a database (e.g. the database 242b, a separate repository or database (e.g., database 242d), or in the memory 234.

Referring to FIG. 1, the system 200 can incorporate the collaborative filtering recommendation platform 100. The linearly scalable database 116 can be included in the database 242b. The graph database 108 can be the database 242c. The preparatory materials 112 and the diagnostic quizzes 110 can be included in a database in the system 200. For example, they may be included in the database 242d.

Though system 200 includes databases 242b-d, the system 200 may include less than three databases or more than three databases. The information and data stored in the three databases can be stored in any or all appropriate databases.

Skills-based searching can be a search for many different skills. A first set of skills may be the learning about tools and technologies associated with or for use by the course content. The tool or technology may be considered a means to the teaching of the application or course content and not necessarily a skill directly taught by the course. The instructor for the course, therefore, may not even mention the tool or technology in relation to the course. For example, NumPy is a fundamental package for scientific computing with Python and can be considered a tool or technology for use by the course content and not necessarily a skill directly taught by the course. Using skills-based searching to search for NumPy can return a list of courses with specializations in data science, computational investing, and machine learning in which Python uses the NumPy package. In another example, the use of skills-based searching for MATLAB can return one or more courses that directly teach MATLAB (e.g., Intro to Programming with MATLAB) along with other courses that teach applied applications in MATLAB, for example, in the robotics, machine learning, and biotechnology spaces.

A second set of skills can be referred to as granular skills. Granular skills can be skills that a course teaches that may not be mentioned in the description or syllabus for the course. For example, calculated probability (P-value) can be used in statistical hypothesis testing. In general, skills at this level of granularity (specificity) may not be included in a description or syllabus for a course. Using skills-based searching to search for calculated probability or P-value can return a list of courses that can include statistics and data science courses.

A third set of skills can be referred to as soft skills. Soft skills can be skills that are a byproduct of a learning experience that may not be explicit learning objectives or skills of a course. Soft skills can be byproducts of a learning experience and not specific objectives. For example, learners providing feedback on a course titled "Learning How To Learn", a course that provides mental tools to help learners master tough subjects, that the skills of confidence and stress management are taught. Using skills-based searching to search for stress management can return the course "Learning How to Learn". Using skills-based searching to search for confidence can also return the course "Learning How to Learn".

As shown in FIG. 2, the system 200, and specifically the server 242a, can include the skills mapping service 102, the evaluation service 104, the recommendation service 106, the AB testing service 120, the skill query service 124, the skill metadata management service 122, and the graph service 130.

The skills mapping service 102 can be implemented on the server 242a as one or more hardware and/or software modules that can be accessed and executed by the CPU 232 under the direction of the O/S 236. The computer system 230 can execute one or more software applications included in the skills mapping service 102 when performing skills-based searches.

The evaluation service 104 can be implemented on the server 242a as one or more hardware and/or software modules that can be accessed and executed by the CPU 232 under the direction of the O/S 236. The computer system 230 can execute one or more software applications included in the evaluation service 104 when performing skills-based searches.

The recommendation service 106 can be implemented on the server 242a as one or more hardware and/or software modules that can be accessed and executed by the CPU 232 under the direction of the O/S 236. The computer system 230 can execute one or more software applications included in the recommendation service 106 when performing skills-based searches and recommendations.

The A/B testing service 120 can be implemented on the server 242a as one or more hardware and/or software modules that can be accessed and executed by the CPU 232 under the direction of the O/S 236. The computer system 230 can execute one or more software applications included in the A/B testing service 120 when performing A/B testing.

The skill query service 124 can be implemented on the server 242a as one or more hardware and/or software modules that can be accessed and executed by the CPU 232 under the direction of the O/S 236. The computer system 230 can execute one or more software applications included in the skill query service 124 when performing a skills query as described herein.

The skill metadata management service 122 can be implemented on the server 242a as one or more hardware and/or software modules that can be accessed and executed by the CPU 232 under the direction of the O/S 236. The computer system 230 can execute one or more software applications included in the skill metadata management service 122 when managing the metadata for skills mapping.

The graph service 130 can be implemented on the server 242a as one or more hardware and/or software modules that can be accessed and executed by the CPU 232 under the direction of the O/S 236. The computer system 230 can execute one or more software applications included in the graph service 130 when creating, generating, maintaining, and traversing skills graphs as described herein.

The system 200, and specifically the server 242a, can include a skills-tagging application 240. As described herein, courses can be tagged with one or more skills. For example, an instructor, using the computing device 202a, can interact with a GUI 212 (e.g., the skills-tagging GUI provided by the skills-tagging application 240). Referring for example to FIG. 3A, the web application 228 can display in the web browser UI 214 a skills list 306 and a request for the instructor to select one or more of the skills included in the skills list 306 as taught by the content of the course. The selected skills can be tagged to the course. In addition or in the alternative, the UI can provide a skill input entry field 260. The instructor can enter a skill taught by the course that may not be included for selection in the skills list 306. The newly entered skill can also be tagged to the course.

The skills-tagging application 240 can access the skill library 118 included in the database 242d to create or generate the skills list 306. In some implementations, the skills list 306 presented to the instructor for the particular course can include a list of skills with the highest occurrence of a skill_id for the course. In some cases, the list may be sorted in order of a score. For example, a skill can be scored for a particular course by calculating the predicted probability a skill is taught by a course based on the skill-course classification model 244. In some implementations, if an instructor provides a skill for tagging to a course that is not provided by the skills list 306, the skills-tagging application 240 can add the new skill to the skill library 118 by storing the new skill in the skill library 118.

In some implementations, the skills-tagging application 240 may tag a skill to a smaller unit of course content, such as a module, lesson, or video. In these implementations, a skills search can direct a learner to not only a course that teaches a specific skill but to the module(s), lesson(s), or video(s) included in the course that actually teach the specific skill. Skill-module, skill-lesson, and/or skill-video tagging can enable more targeted (granular) course recommendations. In addition or in the alternative, skill-module, skill-lesson, and/or skill-video tagging can provide a sequence of skills taught by a course. For example, if courses in general teach a first skill before teaching a second skill, if a course teaches the second skill without teaching skill the first skill, it may be inferred that the first skill is a prerequisite for mastering the teachings of the second skill.

The skill-course classification model application 244 can maintain a skill-course classification model that can measure the likelihood that any given skill is taught by any given course offered by an online course provider. The skill-course classification model application 244 can provide a response variable as a binary label that indicates if a queried skill is tagged to a particular course. For example, a learner may be interested in learning more about Python. The learner may be interested in knowing if the course they are planning to take in computer architecture teaches anything about Python. The skill-course classification model application 244 can access the tagged course content included in the database 242b to determine if the Python skill is tagged to the computer architecture course.

The skill-course classification model application 244 can also determine an occurrence of (a data value representative of the occurrence) or calculate occurrence data for a skill in each type of course content. The course content can be one more types that can include, but are not limited to, video transcripts, course title, course description, module titles, module descriptions, assessment questions, assessment correct answers, and assessment incorrect answers. A learner can provide feedback on the skills taught by the course when interacting with the catalog service 414 by way of, for example, a learner-facing data collection survey 132. The skill-course classification model application 244 can receive information and data gathered by the catalog service 414 and the skills-tagging application 240 for a particular course to refine and update a skill-course classification model for the particular course.

The skill-course classification model application 244 can regularly and periodically update skill-course classification models for courses. In some implementations, updates can be performed regularly on a timed basis (e.g., daily, weekly, monthly). In some implementations, updates can be performed when a count of learner feedback for a particular skill reaches a certain threshold level. For example, if a certain number of learners (e.g., five or more) mention a particular skill in the received course feedback, the skill can be tagged to the course.

In some implementations, the skill-course classification model application 244 can calculate a skill-course ranking score for a skill tagged to a particular course. A relevance score can be a ranking score that captures a relevance of the skill to the course. For example, the higher or greater the score the more relevant the skill is to the course. A learner choice score can be a ranking score that is directed towards measuring the preference of a learner for one or more courses given that the learner wants to learn that particular skill. The learner choice score can be used to rank course offerings in a skills-based search, a skills-based browse, a skills-based recommendation, or other similar skills-based course discovery or query mechanisms.

A query UI application 246 can generate query user interfaces for display to a learner on a display device (e.g., the display device 220) of a computing device 202a of the learner. The query UIs can enable a learner to interact with a GUI (e.g., the GUI 212) in order to enter information and data for use by the skill query service 124 (e.g., a skill, a course name, a career). In addition or in the alternative, the query UI application 246 can generate user interfaces for display to a learner on a display device (e.g., the display device 220) of a computing device 202a of the learner that can provide returning information and data from the skill query service 124 (e.g., an ordered skills list, an ordered course list, an ordered list of modules, lessons, and/or videos for a course).

An editing UI application can generate editing user interfaces for display to a learner on a display device (e.g., the display device 220) of a computing device 202a of the learner. The editing UIs can provide a user with the appropriate editing authority (e.g., an instructor, an administrator) with user interfaces that can allow the user to submit editing requests to the skill metadata management service 122.

The system 200 can include an improved computer system 230. The inclusion of the databases 242b-d allows storage of skills graphs as directed acyclic graphs in one database. Storage of the graphs allows for A/B testing of the graphs. The A/B testing can determine a best skills map for a course. The inclusion of the databases 242b-d allows storage of course content in the linear database that can be a scalable database. The building of a graph database on top of the linear scalable database preserves the linear scalability of the linear scalable database that stores course content while allowing graph traversals of the data stored in the linear scalable database.

FIG. 3A is a diagram of an example user interface 302 for the editing UI 126 provided by the editing UI application 248. For example, referring to FIG. 2, an instructor or administrator can interact with a web application 228 that can access the editing UI application 248. In the example shown in FIG. 3A, an instructor can enter a course name in a course name entry field 304. The instructor can select a skill from a list of skills included in a skill dropdown menu 306 to tag to the course. Selecting a tag button 308 can tag the selected skill to the course.

Tagging a skill to a course can include associating a skill_Id for the selected skill with the course in a database that includes data about the course (e.g., the database 242b as shown in FIG. 2). The database 242b and specifically a skill library (e.g., the skill library 118) can include a listing of skills and associated skill_Ids.

FIG. 3B is a diagram of an example user interface 312 for the query UI 128 provided by the query UI application 246. For example, referring to FIG. 2, a learner can interact with a web application 228 that can access the query UI application 246. In the example shown in FIG. 3B, a learner can enter a skill in a skill entry field 314. In some implementations, a learner may select a skill from a skill dropdown menu. The learner can select a search button 316. Upon selection of the search button 316, one or more courses that teach the skill entered in the skill entry field 314 is displayed in an available courses menu area 318.

Figure 4:
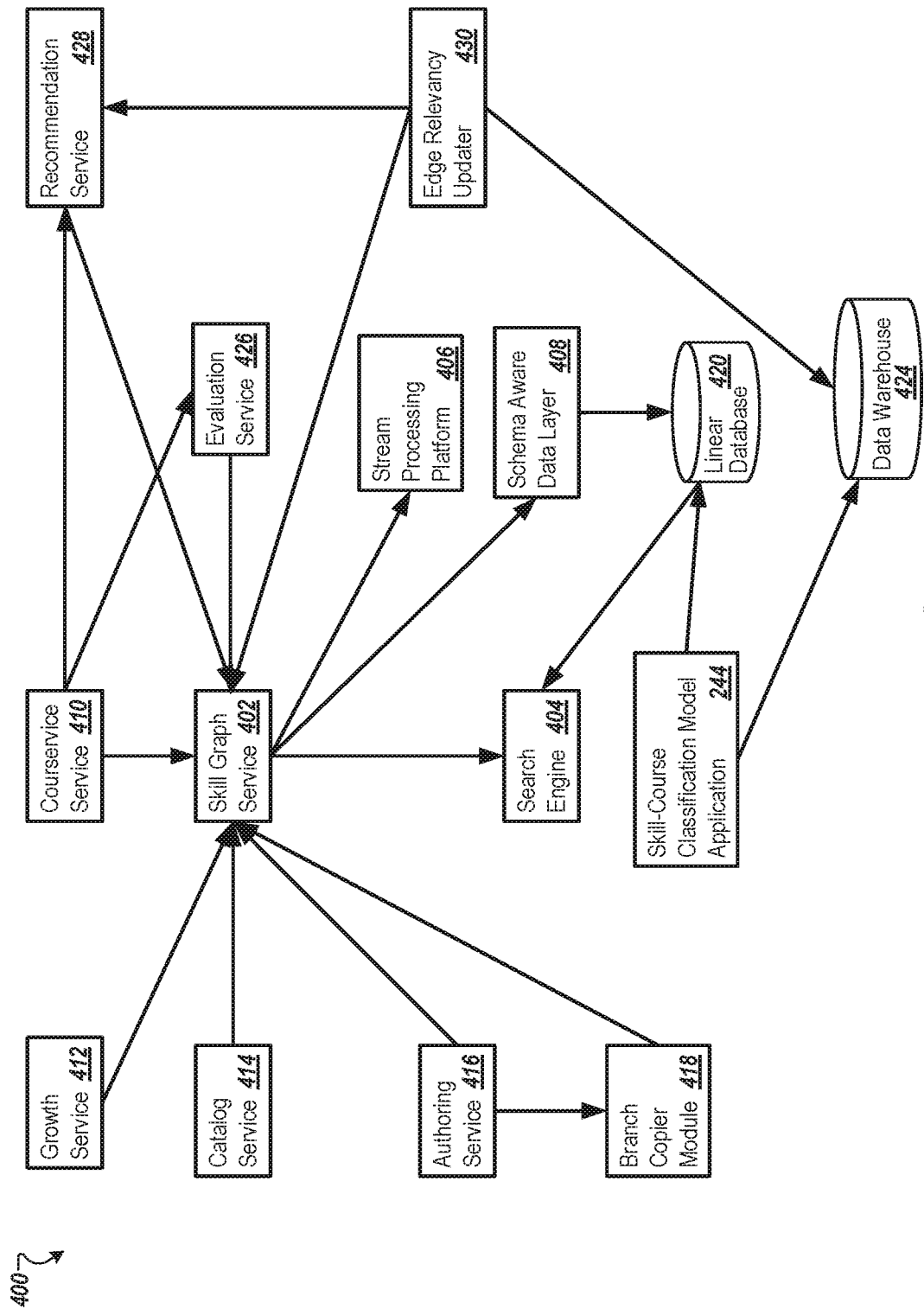
FIG. 4 is an example block diagram showing the use of a skill graph service.

FIG. 4 is an example block diagram 400 showing the use of a skill graph service 402. The services and modules included in the diagram 400 can be included in the computer systems and computing devices disclosed herein in hardware and/or software for execution by one or more processors included in computer system and devices. For example, the skill graph service 402 can be the skill graph service 130 as shown if FIG. 1 and FIG. 2. The skill graph service 402 can provide one or more create, read, update, and delete (CRUD) application programming interfaces (APIs). The skill graph service 402 can use the CRUD APIs to manipulate the vertices and edges included in a skills graph. The skill graph service 402 can perform the manipulation using an identifier for a vertex (vertexId).

A courservice service 410 can provide graphics layout engine (GLE) scripting language support to the skill graph service 402. The skill graph service 402 can use the GLE when creating and generating skills graphs. The courservice service 410 can provide one or more dashboard APIs to the skill graph service 402. The skill graph service 402 can use the dashboard APIs when creating and generating skills graphs. In some implementations, referring to FIG. 2, the courservice service 410 can be provided by a computer system that can be accessed by way of the network 216. In some implementations, the courservice service 410 can be provided by the computer system 230.

A growth service 412 can provide personalized learner onboarding based on domains and competencies (subdomains). The growth service 412 can provide personalized learner recommendations based on domains and competencies (subdomains). The growth service 412 can provide the personalized learner onboarding and the personalized learner recommendations to the skill graph service 402. In some implementations, referring to FIG. 2, the growth service 412 can be provided by a computer system that can be accessed by way of the network 216. In some implementations, the growth service 412 can be provided by the computer system 230.

The catalog service 414 can provide course feedback by skill (skill name) to the skills graph service 402. The course feedback by skill can be based on the results of a learner-facing survey (e.g., referring to FIG. 1, the learner facing survey 132). The learner-facing survey can provide a measure of a skill learned by a learner in a course as self-reported by the learner. In some implementations, referring to FIG. 2, the catalog service 414 can be provided by a computer system that can be accessed by way of the network 216. In some implementations, the catalog service 414 can be provided by the computer system 230.

An authoring service 416 can allow an instructor or supervisor to provide graph updates to the skill graph service 402. Edge values for a skills graph may be overridden based on a domain expert (e.g., an instructor, an administrator) contributing to the skill taxonomy. In some implementations, referring to FIGS. 1 and 2, the authoring service 416 can interface with or be part of the skill metadata management service 122. As described, an editing UI (e.g., the editing UI 126) can provide a GUI that can allow an instructor to submit editing requests to the skill metadata management service 122 that can result in graph updates. The authoring service 416 can access or interface with a branch copier module 418. The branch copier module 418 can create a new branch on the skills graph. The branch copier module 418 can find and copy a subgraph from a previous branch and provide the subgraph to the skill graph service 402. In some implementations, referring to FIG. 2, the authoring service 416 and the branch copier module 418 can be provided by a computer system that can be accessed by way of the network 216. In some implementations, the authoring service 416 and the branch copier module 418 can be provided by the computer system 230.

A skills graph can include one or more super user endpoints. A super user endpoint can allow a changing of a relevancy score for an edge. A super user endpoint can allow boosting of edges. In some implementations, the super user endpoint can be accessed online and offline. In some implementations, the skill graph service 402 can access or interface with an enterprise search engine 404 to provide auto-completion of skill queries. When the skill queries are by skill name, the enterprise search engine 404 can use a mapping of a skill name alias to a skill vertexId when using a CRUD read API to access a linear database 420. New skills along with their aliases can be added to the linear database 420 for later query by the enterprise search engine 404. In some implementations, in addition or in the alternative, new skills along with their aliases can be added to the skill library 118 as shown in FIG. 1. In some implementations, the linear database 420 can be the linear scalable database 116 as shown in FIG. 1. In some implementations, the linear database 420 can be included in the database 242b as shown in FIG. 2. In some implementations, referring to FIG. 2, the enterprise search engine 404 and the linear database 420 can be provided by a computer system that can be accessed by way of the network 216. In some implementations, the enterprise search engine 404 and the linear database 420 can be provided by the computer system 230.

Referring to FIG. 2, the skill-course classification model application 244 can extract data from the linear database 420. The skill-course classification model application 244 can transform the extracted data to generate a recommendation model and one or more skills graph edge relevancy updates. The recommendation model and one or more skills graph edge relevancy updates can be loaded into or provided to a data warehouse 424. The data warehouse 424 can be an internet hosting service provided by a cloud-computing platform of services that can manage massive parallel processing.

In some implementations, an extract, transform, and load (ETL) process can manage changes and perform analysis of the data included in the linear database 420. For example, an ETL process can update relevancy scores of edges of a skills graph in an offline mode of operation. The updated scores can be stored in the data warehouse 424. The skill-course classification model application 244 can include a unified data platform application that supports real-time analytics and event driven applications at scale. The skill-course classification model application 244 can access updated scores and update a skills graph.

When using a CRUD write API, edges can be added to the skills graph. A subsequent message can be posted to a stream processing platform module 406 for handling real-time data feeds. Downstream consumers of the skills graph can read the posted message for auditing or notification purposes. The skill graph service 402 can access or interface with the stream processing platform module 406 to provide notifications of graph updates so that the consumers can perform advanced custom operations (e.g., logging or reporting). In some implementations, referring to FIG. 2, the stream processing platform module 406 can be provided by a computer system that can be accessed by way of the network 216. In some implementations, the stream processing platform module 406 can be provided by the computer system 230.

An evaluation service 426 can interface with the courservice service 410 to generate a quiz and to evaluate a quiz. The courservice service 410 can provide user interface services to the evaluation service 426 for generating and evaluating a quiz. The evaluation service 426 can interface with the skill graph service 402. The skill graph service 402 can fetch a quiz from the evaluation service 426 based on a skill and relevant course material. The evaluation service 426 can be the evaluation service 104 as described with reference to FIGS. 1 and 2.

A recommendation service 428 can interface with the courservice service 410 to provide a recommendation reference for particular content (a course). The courservice service 410 can provide user interface services to the recommendation service 428 for providing a recommendation. The recommendation service 428 can interface with the skill graph service 402. The skill graph service 402 can fetch a skill taxonomy from the recommendation service 428. The recommendation service 428 can interface with an edge relevancy updater module 430. The edge relevancy updater module 430 can provide updated recommendation scores to the recommendation service 428. The edge relevancy updater module 430 can provide updated edge scores to the skill graph service 402. An edge of a skills graph can be directed from (connect) a first vertex to a second vertex in a directed manner. A vertex of a skills graph can represent a skill. An edge can include properties for one or more relationships between the first vertex and the second vertex (e.g., a skill relationship). A relevance can be a value or score of a relevancy of the first vertex to the second vertex (e.g., how relevant to the skill represented by the first vertex is the skill represented by the second vertex). The recommendation service 428 can be the recommendation service 106 as described with reference to FIGS. 1 and 2.

A schema-aware data layer 408 can provide an interface between the skill graph service 402 and the linear database 420. The skill graph service 402 can access or interface with the schema-aware data layer 408. The schema-aware data layer 408 can interface with the skill graph service 402 to provide graph create, read, update, and delete basic functions of persistent storage to the skill graph service 402. The schema-aware data layer 408 can interface with the skill graph service 402 to provide skill hierarchy query functionality for interfacing with the linear database 420. The schema-aware data layer 408 can interface with the skill graph service 402 to provide related skill information to the skill graph service 402. The schema-aware data layer 408 can access the linear database 420 to obtain skill information by domain (sub domain).

Each cycle in a directed acyclic graph can include a root node. When adding edges to a directed acyclic graph, an edge may not be added to the graph that creates cycles for the given type of edge. When using a CRUD read API, a hash table of tuples (vertex, edge type) can be cached. The caching can prevent cycles that could occur if the graph were traversed, asking for other relationships then returning back to the same relationship.

A learner can take self-assessments based on skills they learned. The learner can be provided with recommended supporting content, if needed, for further review. For example, referring to FIGS. 1 and 2, an evaluation service 104 can provide the self-assessments. A learner can complete a self-assessment. On completion, a learner can have one or more skills added to their profile. In some cases, a learner may assess the skills they have learned for a particular career or to advance in another skill. In some cases, a learner can search for a skill (e.g., a search bar may be provided on a user interface for the online course provider) to find content (a course) that teaches the skill.

A learner can access the evaluation service to take a quiz or assessment. The quiz or assessment can present different questions testing the same skills to different learners or different questions to the same learner at different times. A learner can receive recommendations for materials for review when the learner fails the quiz. In addition or in the alternative, the evaluation service can infer from other learner data that the learner may need supporting material. Specifically, the learner may receive directed quiz feedback linking questions and responses to specific learning resources A learner can take self-assessments to determine mastery of a certain skill and to determine what skill(s) and/or content (courses) the learner should take next. In some implementations, a record of mastery of skills can be used to test out of certain content (courses). A learner can obtain a personalized learning plan based on skill assessment and based on an understanding of goals of the learner. In some implementations, a learner can take a pre-assessment to customize a course. The course customization can include removing some course items and/or adding other course items based on a learner pre-course assessment. In these implementations, a course would need to include item level skill tagging.

A learner decides to browse courses by career readiness and/or by skill. The learner can filter out content (courses) where they lack the prerequisite skills. In addition or in the alternative, a learner can search for skills and can then find courses that teach those skills. In addition or in the alternative, a learner can search for a career. The learner can obtain a list of courses that provide the needed skills for the career. A learner can select a course and can then determine the skills that are taught by the course. In addition, the learner can obtain information about other content (courses) that teach the same skills or related skills. The learner can search for alternative content (courses) if the learner lacks identified prerequisite skills for the course. The learner can also take diagnostic quizzes based on the prerequisite skills to determine if the learner is ready (prepared) to take the course. If the learner is not prepared to take the course, the learner can search for and discover other content (courses) that can prepare the learner for the same career.

A learner can obtain recommendations for courses or sequences in onboarding or in recommended content based on skills the learner may want to learn and based on a diagnostic skills assessment.

In order to identify pre-requisite and/or supplementary materials to recommend to learners for a course, item level skill tagging should be implemented for the course. In order to implement skills-based learning using practice assessments and summative assessments, the content can be based on skills. Item level skill tagging should be implemented for the course.

In some implementations, material for review when learner fails a quiz can be recommended. In addition or in the alternative, the need for additional supporting material for the learner can be inferred from other learner data. Specifically, directed quiz feedback linking questions and responses to specific learning resources can be provided to the course provided. Item and/or module level skill tagging should be implemented for the course.

In order to customize a course (e.g., remove some items, add other items) based on learner pre-course assessment, the course should implement item level skill tagging.

In order to provide an evaluation engine that can present different questions testing the same skills to different learners or different questions testing the same skills to the same learner at different times may require the implementing of sub-item level skill tagging.

Allowing learners to search for skills during discovery and allowing learners to search for skills at any time to find content that teaches that skill may require implementing item level skill tagging. Creating personalized learning plans based on a learner skill assessment and based on learner goals may require item and/or module level skill tagging.

Figure 5:
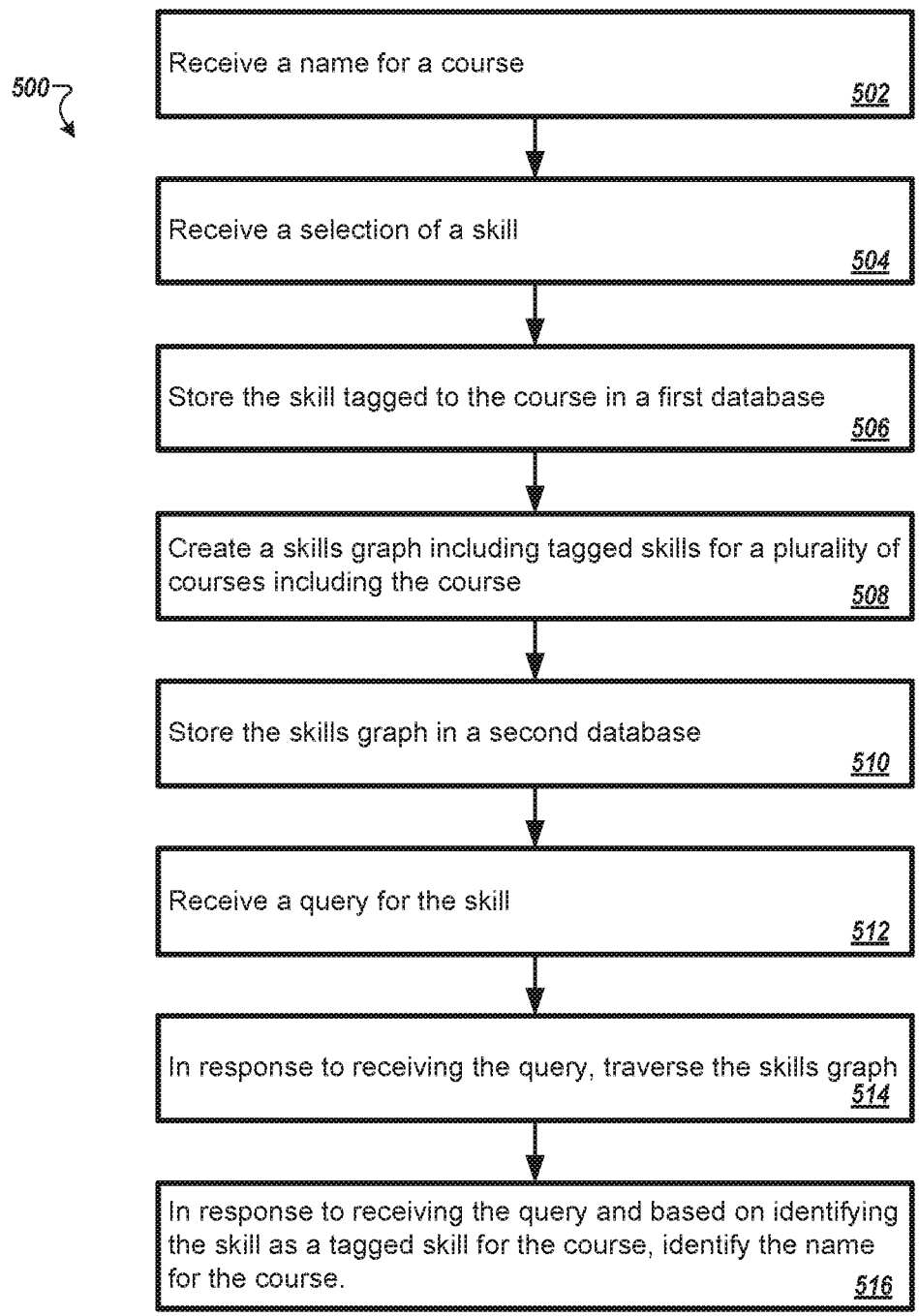
FIG. 5 is a flowchart that illustrates a method for tagging and identifying skills for a course.

FIG. 5 is a flowchart that illustrates a method 500 for tagging and identifying skills for a course. In some implementations, the systems and processes described herein can implement the method 500. For example, the method 500 can be described referring to FIGS. 1-4.

A name for a course is received by the computer system (block 502). For example, referring to FIGS. 1, 2, and 3A, the editing UI application 248 can provide a user interface 302 for an editing UI 126. An instructor can enter a name for a course in the course name entry field 304. A selection of a skill is received by the computer system (block 504). For example, the instructor can select a skill from a skill dropdown menu 306 to tag to the course. Selecting a tag button 308 can tag the selected skill to the course.

The skill tagged to the course can be stored in a first database (block 506). For example, the skill for tagging to the course can be provided to the editing UI application 248 for storage in association with the course in the database 242b. A skills graph including tagged skills for a plurality of courses including the course can be created (block 508). The skills graph can provide a graph of a skills hierarchy for the course. For example, the graph service 130 can create the skills graph. The skills graph can be stored in second database included in the computer system (block 510). For example, the skills graph can be stored in the graph database 108.

A query for the skill is received by the computer system (block 512). For example, referring to FIG. 3B, a learner can enter the skill in the skill entry field 314. In response to receiving the query, the skills graph can be traversed (block 514). The traversing can identify the skill as a tagged skill for at least the course. For example, the query UI application 246 can receive the skill name and provide the skill name to the graph service 130 for use in traversing skills graphs stored in the graph database 108. In response to receiving the query and based on identifying the skill as a tagged skill for the course, the name for the course can be identified (block 516). For example, the graph service 130 can access the linear scalable database 116 to determine the name for the course.

Figure 6:
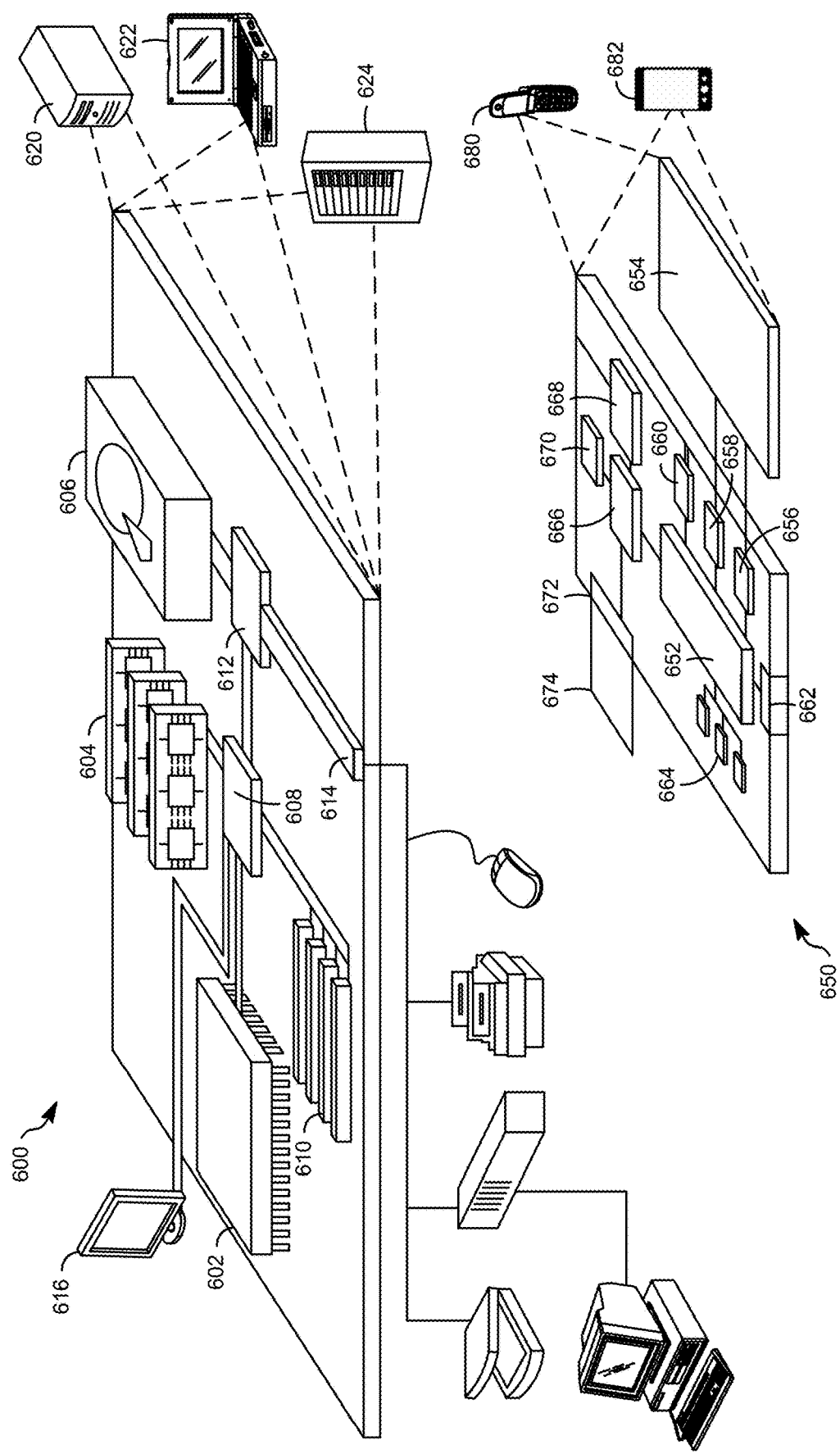
FIG. 6 shows an example of a computer device and a mobile computer device that can be used to implement the techniques described here.

FIG. 6 shows an example of a generic computer device 600 and a generic mobile computer device 650, which may be used with the techniques described here. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652, that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smart phone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method comprising:
    receiving, by a computer system, a name for an online course stored in a linear scalable database;
    identifying a skill taught by the online course;
    tagging the skill to the named online course;
    constructing a skills graph including tagged skills for a plurality of online courses stored in the linear scalable database including the named online course, the skilled graph connecting the tagged skills to each other and to online course content, the skills graph being a series of vertices and edges, an edge between a skill vertex and an online course content vertex representing a relevancy of the tagged skill represented by the skill vertex, the skills graph including a graph of a skills hierarchy for the plurality of online courses;
    storing the skills graph;
    receiving, by the computer system, a query for a specific skill;
    in response to receiving the query, discovering online course content corresponding to the specific skill by traversing the skills graph, the traversing identifying the specific skill as the tagged skill for at least the named online course;
    based on identifying the specific skill as the tagged skill for the named online course, identifying the name for the course; and
    presenting the named online course over a communication network to teach the specific skill to a learner.

2. The computer-implemented method of claim 1, wherein traversing the skills graph further comprises creating an ordered list of online courses included in the plurality of online courses that are tagged with the specific skill.

3. The computer-implemented method of claim 1, wherein traversing the skills graph further comprises creating an ordered list of at least one of modules, lessons, or videos for the named online course that teaches the specific skill.

4. The computer-implemented method of claim 1, further comprising, in response to receiving the query, creating a profile for the specific skill.

5. The computer-implemented method of claim 1, further comprising, in response to receiving the query, identifying other skills related to the specific skill.

6. The computer-implemented method of claim 1, further comprising, in response to receiving the query, identifying at least one prerequisite skill for mastering the specific skill.

7. The computer-implemented method of claim 1, wherein the skills graph is a directed acyclic graph.

8. The computer-implemented method of claim 1, wherein the skills graph maps skills to course content.

9. The computer-implemented method of claim 1,
    wherein an edge of the skills graph is directed from a first vertex to a second vertex, and
    wherein the edge of the skills graph has an associated relevancy score indicating a relevancy of a skill represented by the first vertex relative to a skill represented by the second vertex.

10. A non-transitory, machine-readable medium having instructions stored thereon, the instructions, when executed by a processor, cause a computer system to:
    receive a name for an online course, the named online course being one of a plurality of online courses stored in a linear scalable database;
    identify a skill taught by the named online course;
    tagging the skill to the named online course;
    construct a skills graph including tagged skills for the plurality of online courses including the named online course stored in the linear scalable database, the skilled graph connecting the tagged skills to each other and to online course content, the skills graph being a series of vertices and edges, an edge between a skill vertex and an online course content vertex representing a relevancy of the tagged skill represented by the skill vertex, the skills graph including a graph of a skills hierarchy for the plurality of online courses;
    storing the skills graph;
    receive, by the computer system, a query for a specific skill;
    in response to receiving the query, discover online course content corresponding to the specific skill by traversing the skills graph, the traversing identifying the specific skill as the tagged skill for at least the named online course;
    based on the identifying the specific skill as the tagged skill for the named online course, identify the name for the named online course; and
    present the named online course over a communication network to teach the specific skill to a learner.

11. The non-transitory, machine-readable medium of claim 10, wherein the instructions that cause the computer system to traverse the skills graph further include instructions that cause the computer system to create an ordered list of courses included in the plurality of courses that are tagged with the specific skill.

12. The non-transitory, machine-readable medium of claim 10,
    wherein an edge of the skills graph is directed from a first vertex to a second vertex, and
    wherein the edge of the skills graph has an associated relevancy score indicating a relevancy of a skill represented by the first vertex relative to a skill represented by the second vertex.

13. The non-transitory, machine-readable medium of claim 10, wherein the skills graph maps skills to course content.

14. The non-transitory, machine-readable medium of claim 10, wherein the skills graph is a directed acyclic graph.

* * * * *